Figure 1:
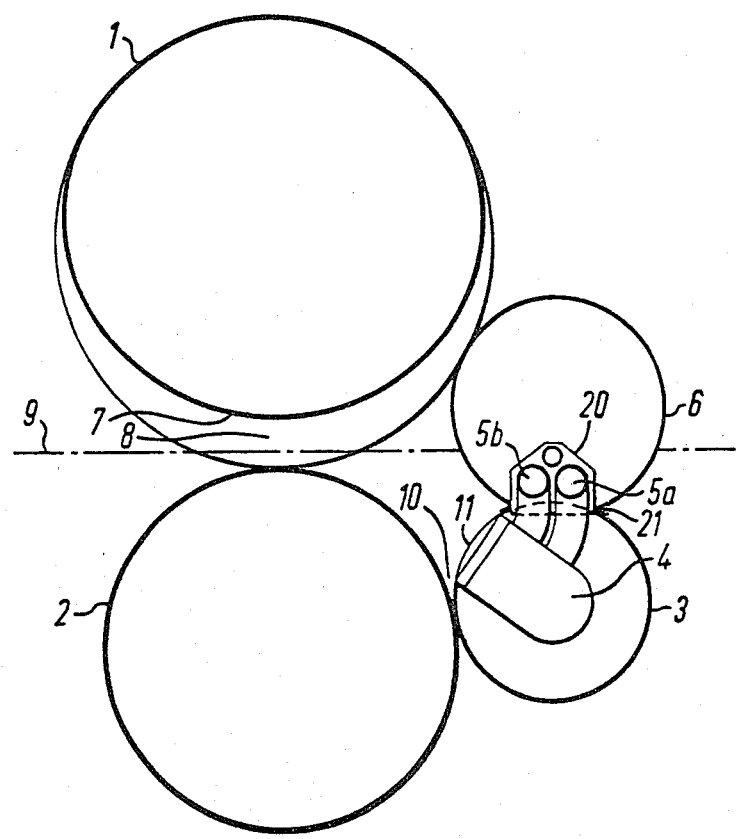

United States Patent [19]

Webb

[11] 4,342,655
[45] * Aug. 3, 1982

[54] METHOD AND APPARATUS FOR DISPERSING OIL SLICKS

[75] Inventor: Michael G. Webb, Wootton Bridge, England

[73] Assignee: The British Petroleum Company Limited, London, England

[*] Notice: The portion of the term of this patent subsequent to Jun. 10, 1997, has been disclaimed.

[21] Appl. No.: 154,094

[22] Filed: May 28, 1980

[30] Foreign Application Priority Data

Jun. 8, 1979 [GB] United Kingdom ............... 7920142

[51] Int. Cl.³ ............................................. E02B 15/04
[52] U.S. Cl. ....................................... 210/749; 405/63; 210/242.1; 210/923; 210/925
[58] Field of Search ................. 405/63; 210/749, 776, 210/800, 242.1, 242.2, 922, 923, 925

[56] References Cited

U.S. PATENT DOCUMENTS

| 3,737,040 | 6/1973 | Brydoy et al. | 210/923 |
| 4,112,689 | 9/1978 | Webb | 405/63 |
| 4,207,191 | 6/1980 | Webb | 210/923 |

FOREIGN PATENT DOCUMENTS

| 2013583 | 8/1979 | United Kingdom . |
| 2013781 | 8/1979 | United Kingdom . |
| 1552642 | 9/1979 | United Kingdom . |

*Primary Examiner*—Peter A. Hruskoci
*Attorney, Agent, or Firm*—Morgan, Finnegan, Pine, Foley & Lee

[57] ABSTRACT

A method for the dispersal of oil comprising the steps of
(a) deploying a barrier on water contaminated with oil to enclose, at least partially, an area containing oil, said barrier having one or more weirs in the barrier connecting the enclosed area with a gallery and means for removing oil from the gallery;
(b) allowing oil and associated water to flow over the one or more weirs into the gallery;
(c) adding a dispersant to the oil and water subsequent to its passage over the weir or weirs;
(d) pumping the oil and water from the gallery under conditions such that an emulsion of oil, water and dispersant is formed, and
(e) discharging the emulsion into the water outside the enclosed area.

Also claimed is a barrier suitable for use in the method described for the dispersal of oil spilt on water.

8 Claims, 2 Drawing Figures

METHOD AND APPARATUS FOR DISPERSING OIL SLICKS

The present invention relates to a method for dispersing oil slicks and to a barrier for the trapping and subsequent dispersal of oil spilt on water.

In recent years several instances of oil spillage at sea have occurred and many proposals have been made for the containment and recovery of spilt oil. Most systems proposed have been designed to cope with finite spillages which may occur when a tanker or other oil carrying vessel is involved in an accident. With the increase in off-shore oil production there is an increasing possibility of oil pollution occurring on a large scale should oil wells blow out or oil pipes rupture. Although every precaution is taken to prevent such disasters and to minimise their effect by incorporating oil shut-off devices within oil production units, there nevertheless remains the possibility that an accident to an oil production unit or to a very large tanker could produce a continuing source of oil pollution which would extend the capability of known oil containment and recovery systems.

British Pat. No. 1 522 642 and British Patent Applications Nos. 7902286 (published as British Application No. 2 013 583) and 7907831 describe barriers for oil spilt on water which comprise one or more air chambers and one or more water chambers, all the walls of the chambers being so positioned that when suitably inflated with air and water the barriers will float with part below and part above the water surface so as to impede the passage of floating oil. The barriers or sections thereof are specially adapted to provide weirs over which trapped oil together with associated water flows into galleries from which the oil and water are pumped by a transfer line to a collecting vessel for further separation and recovery.

Such systems are effective in recovering oil, particularly freshly spilt crude oil and light petroleum fractions up to and including gas oil. However, they are not so effective in recovering heavy oils, such as fuel oil and weathered crude oil known as mousse because of the difficulty in pumping such materials. Furthermore, the systems require the use of powerful transfer pumps to deliver recovered oil and water to the separators and the provision of the separators themselves and a collecting vessel which in most cases will be a tanker. Thus considerable expenditure has to be incurred in the provision of ancillary equipment.

We have now discovered that the recovered oil and water can be treated within the barriers and the transfer lines to produce a finely dispersed emulsion which need not be recovered but which can be discharged into the sea off-shore and further dispersed and degraded by natural agents without becoming a pollution hazard.

Thus according to the present invention there is provided a method for the dispersal of an oil slick which method comprises the steps of (a) deploying a barrier on water contaminated with oil to enclose, at least partially, an area containing oil, said barrier having one or more weirs in the barrier connecting the enclosed area with a gallery and means for removing oil from the gallery, (b) allowing oil and associated water to flow over the one or more weirs into the gallery, (c) adding a dispersant to the oil and water subsequent to its passage over the weir or weirs, (d) pumping the oil and water from the gallery under conditions such that an emulsion of oil, water and dispersant is formed, and (e) discharging the emulsion into the water outside the enclosed area.

The barriers described in the patents mentioned above may be adapted for use in the method of the present invention.

Thus in one embodiment, the barrier includes at least one section comprising an elongate, flexible, buoyant, inflatable air chamber, an elongate, flexible, inflatable ballast water chamber and a further elongate, flexible, inflatable water chamber of greater buoyancy than the ballast water chamber; the air chamber and further water chamber being joined to the ballast water chamber in side-by-side relationship, the air chamber being positioned above the ballast water chamber and the further water chamber alongside the ballast water chamber so that when in use on water the buoyant air chamber together with the ballast water chamber forms a barrier for oil spilt on the water and the further water chamber defines a weir between itself and the other chambers. The barrier is also provided with means to remove oil and water from the weir and means for adding dispersant to the oil and water recovered by the barrier and means for emulsifying the oil and water and discharging the emulsion from the barrier.

In a second embodiment, the barrier includes at least one section comprising an elongate, flexible, buoyant, inflatable air chamber having a plurality of sections of reduced diameter, an elongate, flexible inflatable ballast water chamber, an elongate, flexible oil and water discharge tube, and an elongate membrane, one end of the membrane being connected to the exterior of the air chamber and the other to the exterior of the ballast water chamber or the oil and water discharge tube to form a gallery; the buoyant air chamber and the oil and water discharge tube being joined to the ballast water chamber in side-by-side relationship; the chambers, tube and membrane being so positioned relative to one another that when in use on oil polluted water the buoyant air chamber and the ballast water chamber together form a barrier for oil spilt on water except in the sections of reduced diameter of the buoyant air chamber; these sections and the ballast water chamber defining a series of weirs for oil and water to pass into the gallery; the oil and water discharge tube being provided with means to remove oil and water from the gallery and means also being provided for the addition of dispersant to the oil and water and for emulsifying the oil and water and discharging the emulsion from the barrier.

In a third and preferred embodiment, the barrier includes at least one section comprising (1) a first elongate, flexible, buoyant, inflatable air chamber having a plurality of sections of reduced diameter, (2) an elongate, flexible, inflatable ballast water chamber, (3) an elongate, flexible oil and water discharge tube, and (4) a second elongate, flexible, buoyant, inflatable air chamber; the first air chamber, the ballast water chamber, the oil and water discharge tube and the second air chamber being joined together in side-by-side relationship; the chambers and the tube being so positioned relative to one another that, when in use on oil polluted water, the first air chamber and the ballast water chamber together form a barrier for oil spilt on water except in the sections of reduced diameter of the air chamber, these sections and the ballast water chamber defining a series of weirs for oil and water to pass into a gallery; the gallery being formed by the ballast water chamber, the oil and water discharge tube and the second air chamber; means being provided for the addition of dispersant to the oil and water and for discharging the oil, water and dispersant from the barrier. For convenience, the method according to the present invention will be described in the rest of this specification with reference to the preferred embodiment of the barrier.

The chambers and the tube are flexible in order that they can follow the movement of the sea so that the barrier remains effective under sea conditions that would severely reduce the efficiency of a rigid barrier. Suitably they are made of sheets of flexible material, e.g. neoprene coated nylon or other similar material. The flexibility of the material forming the barrier allows it to be stored when deflated in a comparatively small volume.

The chambers and the tube can be readily prepared from flat sheet material by welding or otherwise joining the sheets together.

In practice it is found that good results are obtained when the cross-sectional areas of the unreduced sections of the first air chamber and the ballast water tube are substantially the same but, of course, barriers can be manufactured in which the cross-sectional areas vary, for example, in the ratio of 1:4 to 4:1.

As previously stated, the first buoyant air chamber and the ballast water chamber form for the greater proportion of their length a barrier for oil and water. However, periodically the diameter of the first air chamber is reduced, thus leaving gaps between the ballast water chamber and the sections of the air chamber of reduced diameter. In use these gaps form weirs over which oil and water passes into the gallery where it is restrained by the oil and water discharge tube and the second buoyant air chamber and removed by the oil and water discharge tube.

Preferably the sections of the first air chamber of reduced diameter are produced by tapering the diameter of the air chamber to a lesser value than the original, maintaining the diameter at the lesser value for some length and then increasing the diameter again to its original value.

The sections of reduced diameter may extend in total over 10 to 50% of the length of the barrier, preferably over 15 to 30%. The amount by which the diameter is reduced is not critical provided that it leaves a gap sufficient to cope with the flow of oil and water over the weirs. In general, a reduction in diameter of 10 to 50%, preferably 15 to 30%, will be sufficient to form satisfactory gaps for the weirs.

The second buoyant inflatable chamber is positioned above the oil and water discharge tube and provides buoyancy to support the weight of equipment in the discharge tube and to counteract the pivoting tendency of the latter about the vertical axis of the first air chamber and the ballast water chambers.

Preferred barriers comprise a single first air chamber, a single ballast water chamber, a single oil and water discharge tube and a single second air chamber. However, the function of each of these may be achieved by replacing each of them or any or all of them with two or more separate items if desired.

The barrier is preferably used in conjunction with sections of standard barrier of the type described in British Patent Specifications Nos. 1 188 156, 1 383 315 or 1 554 737. The combined barrier is preferably used in a J configuration with sections of standard barrier forming the arms and being attached to a support vessel and a section of weir barrier according to the present invention forming the curved base where the oil collects.

In use the barrier will first have to be deployed and then the various chambers inflated with air or water as appropriate.

Oil entrapped within the barrier and sea water will spill over the weirs into the gallery from which they must be emulsified and removed. Suitably the oil and water discharge tube contains a series of ports opening into the gallery through which the oil and water can enter.

Pumps are preferably fitted in the oil and water discharge tube behind the entry ports. The dispersant may be added to the oil and water in the gallery, but is preferably added after the oil and water has entered the oil and water discharge tube. Suitably the dispersant is added to the oil and water by means of a distribution nozzle at each pump.

The pumps are provided in the discharge tube both to emulsify the oil and water mixture and to pump the emulsion out of the barrier for dispersal into the sea.

Preferably the design of the barrier is such that each weir is provided with its own gallery and pump so that the flow of the oil, water and dispersant is through the pumps in series. This enhances the emulsification of the oil and water, particularly of the oil and water initially flowing over the upstream weirs which has to pass through several pumps.

Figure 2:
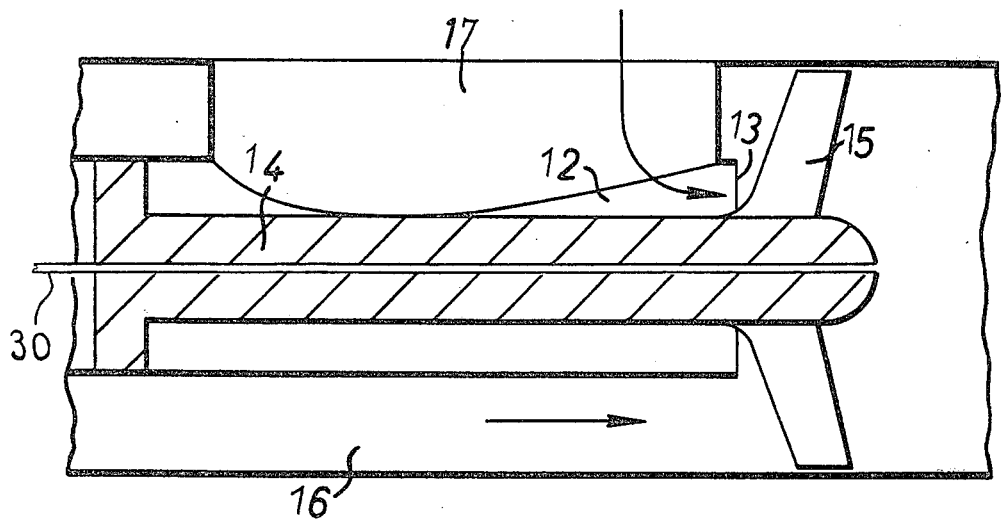

For a better understanding of the invention, reference is made to the drawings, in which FIG. 1 is a vertical cross section of a barrier and FIG. 2 is a partially-schematic side view of the pump used in connection with the present invention.

The barrier comprises a first buoyant air chamber 1, a ballast water chamber 2, an oil and water discharge tube 3 containing a hydraulically operated pump unit 4 and a second buoyant air chamber 6.

The air chamber 1 has section 7 of reduced diameter which leave gaps 8 between the air chamber 1 and the water chamber 2.

Hydraulic fluid is carried to and from the pump unit 4, contained in the oil and water discharge tube 3, by lines 5a and 5b. In order to protect these lines and their associated fittings from the oil and sea water, they are run along inside the second air chamber 6. They are connected to the pump unit 4 via a manifold 20, which protrudes from the oil and water discharge tube 3 into the second air chamber 6 through a seal 21.

In use, the barrier floats in relation to sea water level 9 as shown in FIG. 1. The gaps 8 thus create weirs over which the interface of oil and water flows. The second air chamber 6 co-operates with the oil and water discharge tube 3 and the ballast water chamber 2 to form a gallery 10 which retains the mixture of oil and water before it is removed from the boom.

Removal is effected through apertures 11 and the discharge tube 3 from which pump units 4 take suction.

In order to improve emulsification of the oil and water flowing over the downstream weirs, one or more, preferably two, additional pumps or thrust augmenters are provided in the discharge tube after the pump associated with the last weir so that even from the least favourable location, the last weir, the mixture is sheared in at least two stages.

Suitable pumps are shown in the attached FIG. 2 and are disclosed in our co-pending application No. 7902289 (published as British Application No. 2 013 781). These are double-acting in-line flow inducers comprising a first feed inlet 17, a second feed inlet, a first feed outlet 13, a second feed outlet, and a propeller 15 mounted on a rotatable shaft 14, the blades of the propeller extending over both outlets so that energy is imparted to both feedstocks.

The first feed inlet 17 and the second feed inlet lead, respectively, to flow channel 12 and flow channel 16.

The pumps may be modified to supply dispersant by drilling a supply line 30 along the axis of the shaft 14. Dispersant will be withdrawn from this line by the action of the propeller 15. In this case, the pumps on the barrier may be designed to develop sufficient suction to draw dispersant from storage tanks on an accompanying service vessel which need not itself provide the pumping capacity.

Any suitable dispersant may be used such as, for example, those disclosed in British Patent Specifications Nos. 1 139 222, 1 399 860 and 1 419 803. The latter discloses a composition comprising an ester of a polyoxyethylene glycol and a $C_{10-24}$ fatty acid, an organic sulphate or sulphonate detergent and an alcohol or glycol of molecular weight in the range 90 to 250.

In practice, a 50/50 mixture of oil and water will usually spill over the weirs, but these proportions may alter if conditions vary. The thicker the layer of recovered oil, the lower is the proportion of water associated with the oil.

The quantity of dispersant required is suitably in the range 5 to 80% by volume of the recovered oil, preferably 15 to 40%.

The quantity may well be less than that required by conventional spraying operations because of the better emulsification obtained by the pumping action in the barrier.

In order to aid the final dispersal in the sea, the emulsion should be discharged below the water level, e.g. at a depth in the range 10 to 30 meters depending upon sea conditions.

The present invention results in better emulsification of oil slicks than is achieved by the existing spray and breaker board system, particularly on heavier oils.

In the case of a large spillage of oil, it is obviously desirable to recover it, but the first priority must be to render it as harmless as possible as soon as possible.

Recovering a large quantity of oil requires the deployment of a large recovery vessel, e.g. a tanker, which may not be available immediately. Identifying a suitable vessel and directing it to the scene of the spill may take a day or longer and until the recovery vessel arrives, disposal of the oil is a considerable problem.

During this period, dispersal of the oil by the method according to the present invention is a suitable technique.

If and when a recovery vessel arrives, the addition of dispersant and deliberate emulsification may be stopped and the oil and water recovered by the barrier pumped aboard the recovery vessel for recovery instead of being dispersed into the sea.

Although the method of the present invention has been described with particular reference to its use at sea, it can also be employed on inland water.

I claim:

1. A method for the dispersal of oil comprising the steps of
   (a) deploying a barrier on water contaminated with oil to enclose, at least partially, an area containing oil, said barrier having one or more weirs in the barrier connecting the enclosed area with a gallery and at least one pump associated with each gallery,
   (b) allowing oil and associated water to flow over the one or more weirs into the gallery,
   (c) adding a dispersant to the oil and water by means of a distribution nozzle associated with each pump,
   (d) pumping the oil and water from the gallery through at least two pumps under conditions such that an emulsion of oil, water and dispersant is formed, and
   (e) discharging the emulsion into the water outside the enclosed area, said barrier including at least one section comprising
      (1) a first elongate, flexible, buoyant, inflatable air chamber having a plurality of sections of reduced diameter,
      (2) an elongate, flexible, inflatable ballast water chamber,
      (3) an elongate, flexible, oil and water discharge tube, and
      (4) a second elongate, flexible, buoyant, inflatable air chamber,
         the first air chamber, the ballast water chamber, the oil and water discharge tube and the second air chamber being joined together in side-by-side relationship, the chamber and the tube being so positioned relative to one another that when in use on oil-polluted water the first air chamber and the ballast water chamber together form a barrier for oil spilled on water except in the sections of reduced diameter of the air chamber, these sections and the ballast water chamber defining a series of weirs for oil and water to pass into a gallery, the gallery being formed by the ballast water chamber, the oil and water discharge tube and the second air chamber.

2. A method as claimed in claim 1 in which the emulsion is discharged below the water surface.

3. A method as claimed in claim 2 in which the emulsion is discharged at a depth below the water surface in the range 10 to 30 meters.

4. A barrier for the recovery and dispersal of oil spilled on water, which includes at least one section comprising:
   (1) a first elongate, flexible, buoyant, inflatable air chamber having a plurality of sections of reduced diameter;
   (2) an elongate, flexible, inflatable ballast water chamber;
   (3) an elongate, flexible oil and water discharge tube; and
   (4) a second elongate, flexible, buoyant, inflatable air chamber;
the first air chamber, the ballast water chamber, the oil and water discharge tube and the second air chamber being joined together in side-by-side relationship, the chambers and the tube being so positioned relative to each other that when in use on oil polluted water the first air chamber and the ballast water chamber together form a barrier for oil spilled on water except in the sections of reduced diameter of the air chamber, these sections and the ballast water chamber defining a series of weirs for oil and water to pass into a gallery, the gallery being formed by the ballast water chamber, the oil and water discharge tube and the second air chamber; means being provided for the addition of dispersant to the oil and water and for discharging the oil, water and dispersant from the barrier.

5. A barrier as claimed in claim 4 in which a pump is associated with each weir.

6. A barrier as claimed in claim 5 in which the dispersant is added to the oil and water by means of a distribution nozzle associated with each pump.

7. A barrier as claimed in claim 6 in which at least two additional pumps are positioned downstream of the last weir.

8. A barrier as claimed in claim 7 in which the pumps are double acting in-line flow inducers comprising a first feed inlet, a second feed inlet, a first feed outlet, a second feed outlet, a propeller mounted on a rotatable shaft, the blades of the propeller extending over both outlets so that energy is imparted to both feedstocks and the rotatable shaft having a supply line for the dispersant along its axis.

* * * * *